(12) United States Patent
Misoczki et al.

(10) Patent No.: US 11,356,251 B2
(45) Date of Patent: Jun. 7, 2022

(54) SECURE VEHICLE COMMUNICATION WITH PRIVACY-PRESERVING FEATURES

(71) Applicant: Intel Corporation, Santa Clara, CA (US)

(72) Inventors: Rafael Misoczki, Hillsboro, OR (US); Dave Cavalcanti, Portland, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 16/720,671

(22) Filed: Dec. 19, 2019

(65) Prior Publication Data

US 2020/0127820 A1    Apr. 23, 2020

(51) Int. Cl.
*H04L 29/06* (2006.01)
*H04L 9/08* (2006.01)
*H04L 9/32* (2006.01)
*H04L 9/40* (2022.01)

(52) U.S. Cl.
CPC .......... *H04L 9/0825* (2013.01); *H04L 9/3247* (2013.01); *H04L 63/0442* (2013.01); *H04L 63/061* (2013.01); *H04L 63/0823* (2013.01)

(58) Field of Classification Search
CPC . H04L 9/0825; H04L 9/3247; H04L 63/0823; H04L 63/061; H04L 63/0442; H04L 2209/84; H04W 12/03; H04W 12/02; H04W 4/40

See application file for complete search history.

(56) References Cited

U.S. PATENT DOCUMENTS

| | | | |
|---|---|---|---|
| 9,940,840 B1* | 4/2018 | Schubert | B60F 1/00 |
| 10,440,668 B1* | 10/2019 | Wu | G08G 1/22 |
| 2014/0244144 A1* | 8/2014 | You | G08G 1/22 701/117 |
| 2017/0353548 A1* | 12/2017 | Lin | H04L 67/10 |
| 2018/0184360 A1* | 6/2018 | Cavalcanti | H04W 52/0261 |
| 2019/0090098 A1* | 3/2019 | Byun | H04W 4/06 |
| 2019/0349719 A1* | 11/2019 | Pattan | H04L 67/26 |

(Continued)

FOREIGN PATENT DOCUMENTS

WO    2017105534 A1    6/2017

OTHER PUBLICATIONS

S1 161604 TR 22, Technical Specification Group Services and System Aspects; Study on enhanced 3GPP Support for V2X Services (Release 15).

(Continued)

*Primary Examiner* — Sher A Khan
(74) *Attorney, Agent, or Firm* — KDB Firm PLLC

(57) ABSTRACT

Systems, apparatus, methods, and techniques for facilitating privacy preserving secure communicating in a platoon of devices, such as, vehicles, roadside units, or the like is provided. A service initiator provisions a ring key-set as well as a public key-pair and distributes the keys to user equipment and service coordinators. During operation, user equipment can query, via a service coordinator, the existence of a platoon, form a platoon, or join a platoon with the ring key-set and the public key-pair. To form a platoon the service coordinator can generate a symmetric key and provide the symmetric key to the user equipment. Subsequently, user equipment can communicate using the symmetric key.

23 Claims, 7 Drawing Sheets

(56) References Cited

U.S. PATENT DOCUMENTS

| | | | | |
|---|---|---|---|---|
| 2020/0162449 | A1* | 5/2020 | Nagao | H04L 63/0823 |
| 2020/0175880 | A1* | 6/2020 | Ibrahim | B60W 40/09 |
| 2020/0300649 | A1* | 9/2020 | Kim | G08G 1/0968 |
| 2020/0312154 | A1* | 10/2020 | Mondello | G05D 1/0293 |
| 2020/0342760 | A1* | 10/2020 | Vassilovski | H04W 4/40 |
| 2021/0056854 | A1* | 2/2021 | Ucar | H04W 4/46 |
| 2021/0134159 | A1* | 5/2021 | Cao | H04W 4/40 |

OTHER PUBLICATIONS

IEEE Standard for Wireless Access in Vehicular Environments—Security Services for Applications and Management Messages—IEEE Standards Association—IEEE Std 1609.2™—2016 (Revision of IEEE Std 1609.2-2013).

Ron Rivest, Adi Shamir, and Yael Tauman. "How to Leak a Secret". ASIACRYPT 2001.

E. Brickell and Jiangtao Li: "Enhanced Privacy ID from Bilinear Pairing for Hardware Authentication and Attestation". IEEE International Conference on Social Computing / IEEE International Conference on Privacy, Security, Risk and Trust. 2010.

* cited by examiner

SECURE VEHICLE COMMUNICATION WITH PRIVACY-PRESERVING FEATURES

TECHNICAL FIELD

Embodiments described herein generally relate to providing improved privacy protection against vehicle tracking for connected vehicles.

BACKGROUND

In vehicular networks, vehicles may be configured to communicate with each other devices (e.g., other vehicles, roadside infrastructure, or the like). This is often referred to as vehicle-to-anything (V2X) communication. V2X communication can include vehicle-to-vehicle (V2V) communication and/or vehicle-to-infrastructure (V2I) communication. Vehicular networks (e.g., supporting V2X communication, or the like) may be multi-hop communication networks and may facilitate the communication of real-time traffic information (e.g., congestion, accidents, construction, etc.) and information associated with individual vehicles (e.g., speed, location, direction of travel, etc.) for various transportation-based use cases, such as accident avoidance and route optimization.

However, the constant and frequent exchange of vehicle-related information in these networks may risk exposing private information, such as communication privacy of the senders and receivers, orientation privacy related to the location of vehicles, and route privacy related to the movement or travel of the vehicles.

DETAILED DESCRIPTION

Various embodiments are generally directed to providing increased privacy with respect to communication between vehicles, or other such devices. Modern vehicular communication, such as, V2X communication schemes has the potential to enable new applications, products and services in the context of wireless networks, such as automated cooperative driving groups, vehicle platooning and collective perception of the environment. However, given the complex and multi-party nature of such applications, communication security becomes a critical safety requirement.

In general, the present disclosure provides coordinated application of ring signatures and symmetric cryptography for group communication of devices (e.g., vehicles, or the like) under coverage of a wireless network. It is noted, that the disclosure frequently uses the example of a group (or platoon) of vehicles communicating under coverage of a V2X network. However, this is done for purposes of explanation and not limitation. That is, the disclosure can be applied to other devices (e.g., airplanes, rail, industrial devices, drones, or the like). Furthermore, the disclosure can include both V2I and V2V communication. For example, a platoon can be comprised of vehicles and a roadside unit.

These and other examples are described in greater detail below. In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
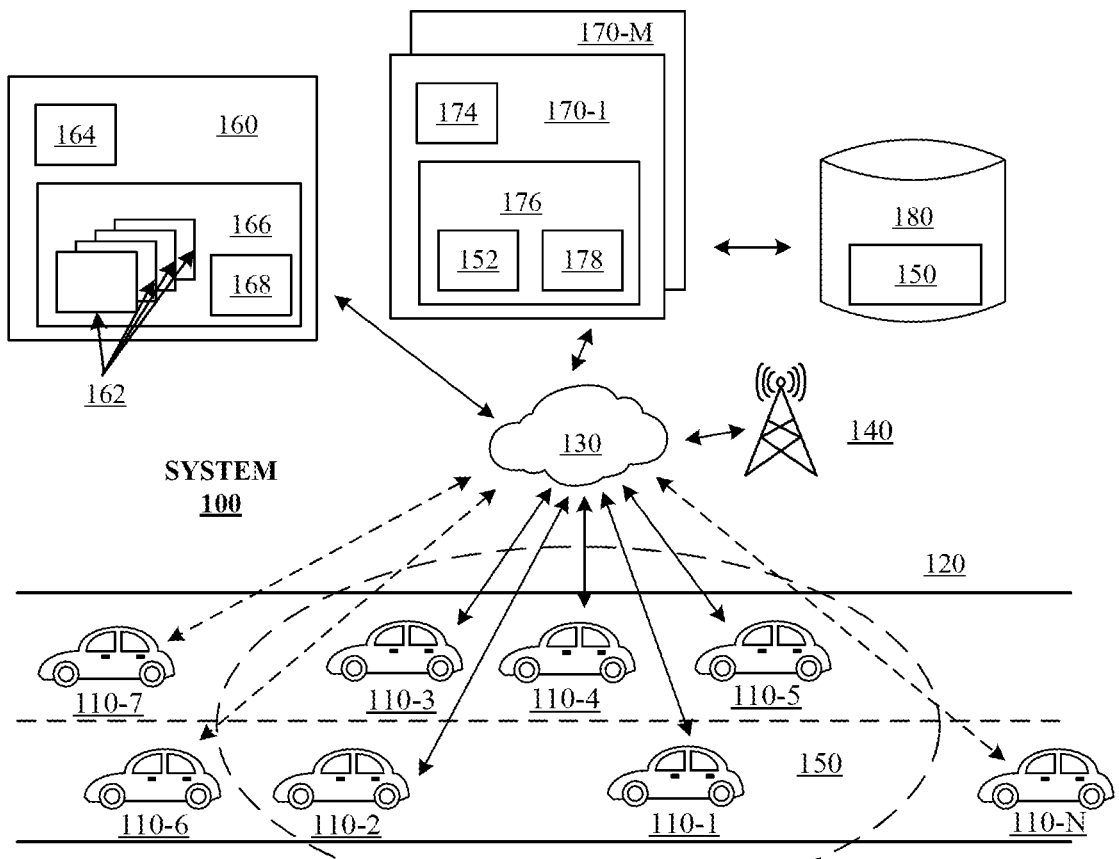
FIG. 1 illustrates a system including a platoon of devices arranged for V2X communication.

FIG. 1 illustrate a system 100 including a number of vehicles 110 traveling on a roadway 120. Vehicles 110 are communicatively connected to communication network 130. Communication network 130 can be any of a variety of networks. In some examples, network 130 is a standard cellular network in which V2X communication is facilitated. As such, network 130 is referred to as V2X network 130 to make clear it is the network through which V2X communication is taking place. V2X network 130 can be based on a variety of V2X communication schemes or standards, such as, the 802.11p Dedicated Short Range Communications standard promulgated by the Institute of Electrical and Electronic Engineers (IEEE), cellular and long-term evolution (LTE) standards promulgated by the 3rd Generation Partnership Project (3GPP). Additionally, the messages communicated via V2X network 130 may be based on one or more standards, such as, SAE J2735, which defines Basic Safety Messages (BSM), among other messages.

Additionally, system 100 can include a road-side unit (RSU) 140 adjacent to the roadway 120. Although these figures illustrate the RSU 140 being arranged at a side of the roadway 120, it may be understood that the RSU 140 may be arranged anywhere (e.g., top, bottom, etc.) near the roadway 120 or in any fashion that allows the RSU 140 to communicate with the vehicles 110 (and vice versa). Moreover, it may be understood that the vehicles 110 connected to the V2X network 130 may not be limited to motor-based vehicles (e.g., gas, diesel, electric), but may be any suitable vehicle configured to perform V2X communication, such as railed vehicles (e.g., trains, trams), watercrafts (e.g., ships, boats), aircraft (airplanes, spaceships, satellites, etc.) and the like. Lastly, the RSU 140 may be mobile and not fixed as depicted.

Any number of vehicles 110 can travel of roadway 120, for example, vehicles 110-1, 110-2, 110-3, 110-4, 110-5, 110-6, 110-7 through 110-N are depicted. Vehicles 110 and RSU 140 can include circuitry arranged to facilitate V2X communication, such as, radios, baseband processors, physical layer circuitry, antennas, and the like.

Vehicles 110, or some of vehicles 110, can form a platoon 150. Vehicles 110 within the platoon 150 (e.g., vehicles 110-1 to 110-5, or the like) can communicate with each other in a secure fashion (described in greater detail below). During operation, vehicles 110 in platoon 150 form a convoy to travel together following a leading vehicle. In such use cases, vehicles 110 in the platoon 150 can be arranged in various configurations and their travel can be coordinated to, for example, increase fuel efficiency (e.g., due to reduced air resistance acting on most of the vehicles, or the like). However, it is to be appreciated that a significant risk to efficiency and/or safety can be introduced where unauthorized (e.g., malicious, or the like) vehicles join the platoon. Such a malicious vehicle 110 in platoon 150 could change direction, speed, or the like to attack the platoon 150. Such attached can be motivated by intents to reduce safety, efficiency, or other malicious purposes.

Accordingly, the present disclosure provides apparatus, systems, methods, and techniques to authenticate communication between vehicles 110 in platoon 150. It is noted that the present disclosure provides a benefit to using conventional cryptographic schemes to authenticate communication between vehicles. In particular, conventional cryptographic schemes can be used to authenticate communication. However, the privacy of the vehicles 110 (e.g., owners, operators, or the like) are not preserved with conventional techniques. For example, conventional techniques often employ certificates to secure or authenticate communication. However, with certificates, a user can be tracked based on continued transmission of the certificate. Furthermore, with some examples, user identities can often be identified from certificates (e.g., where the certificate includes a label, or the like). Thus, conventional techniques do not preserve the privacy of those in the platoon.

Another benefit to the present disclosure is that it can be implemented independently from the network topology under which the vehicles 110 communicate. That is, vehicles 110 connected to different underlying networks (e.g., LTE, 5G, DSRC, or the like) can still form a platoon 150 and communicate as described herein. This results from the present disclosure being implementable at the application layer. Thus, vehicles 110 with heterogeneous radio capabilities can still implement the present disclosure to form platoon 150 wherein privacy preserving authenticated communication can occur.

Lastly, it is important to note that the present disclosure may provide for authorized (e.g., by authorized law enforcement, by court order, or the like) reversal of the privacy preserving features. For example, in some embodiments, group signatures can be used where a privileged entity (e.g., group manager, or the like) can facilitate authorized reversal of the privacy preserving features detailed herein. However, in other examples, ring signatures could be implemented without a group manager. As such, reversal of the privacy preserving features may not be possible.

In general, vehicles 110 and/or RSU 140 of system 100 can securely communicate, under coverage of V2X network 130, via the coordinated application of ring signatures and symmetric cryptography. Initially, a service initiator 160 provides ring keys 162 to vehicles 110 and/or RSUs 140 that are allowed to form platoons in the future. Additionally, service initiator 160 provides ring keys 162 to a number of service coordinators 170. In general, multiple service coordinators 170 are provided in system 100. However, it is noted that some examples, (e.g., where existence of a platoon is not shared, or the like) a single service coordinator 170 could be provided. Although the disclosure here refers to service coordinators 170 in the plural, this is not intended to be limiting.

Ring keys 162 can be keys based on the Rivest, Shamir, Tauman (RST) digital signature algorithm. In general, ring keys 162 provide that a message can be signed by ring keys 162. Messages signed by ring keys 162 can be authenticated by ring keys 162, however, the identity of the sender is obfuscated. In some examples, ring keys 162 can be based on schemes other than the RST digital signature algorithm. As a specific example, ring keys 162 can be based on the Enhanced Privacy ID (EPID) provided by Intel®. As another example, group signature schemes could be used. As noted above, the actual keys 162 could be based on a variety of different cryptographic mechanisms (e.g., ring signatures, group signatures, or the like). The particular mechanism can be selected based on a number of factors, such as, for example, where reversal of the privacy preserving features is desired. Examples provided herein may refer to ring keys 162 and/or ring signatures. However, it is to be appreciated that group signatures, or another suitable mechanism, can be substituted without departing form the scope of the claims.

With some examples, service initiator 160 can be a computing device (e.g., desktop, server, cloud computing device, application server, or the like) arranged to support vehicle platooning. For example, service initiator 160 can be an application server hosted and secured by an entity that supports vehicular platooning. Service initiator 160 can include a processor 164 and memory 166. Memory 166 can include ring keys 162 as well as instructions 168. During operation, processor 164 can execute instructions 168 to generate ring keys 162 and provision ring keys 162 to devices (e.g., vehicles 110, RSUs 140, or the like) in system 100. With some examples, provisioning of ring keys 162 can take place at manufacturing of or deployment of vehicles 110 and/or RSU 140.

Service coordinators 170 (e.g., 170-1 to 170-M, or the like) can be a computing device (e.g., desktop, server, cloud computing device, application server, edge computing device, mobile edge computing device, or the like) arranged to provide local support for vehicles 110 and/or RSUs 140 that use platooning service. Service coordinators 170 can include a processor 174 and memory 176. Memory 176 can include platoon key 152 as well as instructions 178. During operation, processor 174 can execute instructions 178 to provision and/or provide access to platoon 150 via platoon key 152 as described herein.

In some examples, service coordinators 170 can be reached through multiple network connectivity alternatives (e.g., LTE, 5G, DSRC, or the like). As a specific example, service coordinators 170 can be hosted as part of a mobile edge computing capability in wireless base stations (LTE, 5G, etc.) or DSRC road-side units (RSUs).

During operation, vehicles 110 and/or RSU 130 send a request signed with their individual ring key to one of service coordinators 170. The request queries the service coordinator on the existence of a platoon 150 in the region (or vicinity of the sender). The service coordinator 170 can verify the existence of a platoon via service database 180, which stores indications of existing platoons 150. Service database 180 can include entries for platoon 150 including indications of a platoon key 152 as well as other information about the platoon (e.g., direction of platoon, speed of platoon, location of platoon, location and time platoon created, etc.). If a suitable platoon 150 exists, service coordinator 150 can respond to the query with the platoon key 152. Otherwise, service coordinator can release a new platoon key 152 for formation of a new platoon and can register the new platoon 150 in the service database 180.

It is noted that service database 180 may be implemented within a service coordinator 170 and external to service coordinator 170 (as shown). In the case where service database 180 is external to service coordinators 170, service coordinators 170 can communicably couple to service database via a network (e.g., the Internet, or the like). However, in some examples, existence of platoons is not intended to be shared between service coordinators. As such, each service coordinator 170 can maintain a service database (like service database 180) locally.

Furthermore, as noted above, the present disclosure can be implemented with a variety of signature mechanisms, such as, ring signatures or group signatures. For example, system 100 of FIG. 1 could be implemented with ring signatures as described below. Furthermore, it is noted that system 100 could also be implemented with group signatures. For example, either service initiator 160 or service coordinator 170 could act as a group manager and could add members to the group as well as reveal the identity of individual members.

During operation, vehicles 110 and/or RSU 140 can use the platoon key 152 to securely and privately communicate with other devices (e.g. vehicles 110, RSUs 140, or the like) in the platoon 150.

Figure 2:
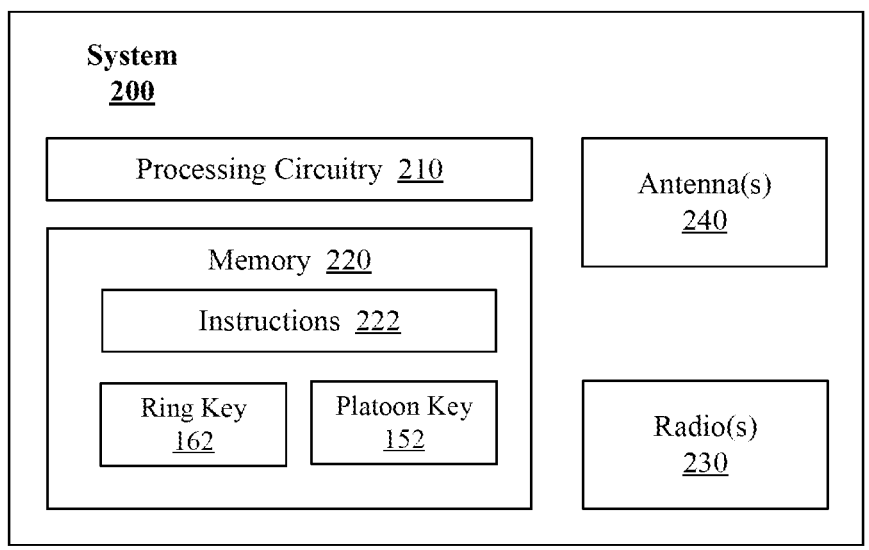
FIG. 2 illustrates a UE.

FIG. 2 illustrates a user equipment (UE) 200 that can be implemented as part of number of vehicles 110, RSU 140, or other device of system 100 of FIG. 1 arranged to communicate in platoon 150 via V2X network 130. UE 200 includes processing circuitry 210, memory 220, radios 230, and antennas 240. It is noted that multiple other components can be provided in UE 200. For example, where UE 200 is implemented in vehicle 110, UE 200 can include ECUs and an in-vehicle network (both not shown).

During operation, processing circuitry 210 can execute instructions 222 to provide the secure private communication within a platoon as described herein. This is described in greater detail below.

Processing circuitry 210 can include any of a variety of processors, such as, for example, commercial central processing units, application specific integrated circuits, or the like. Processing circuitry 210 can be a microprocessor or a commercial processor and can include multiple processing core(s) and cache.

Memory 220 can be based on any of a wide variety of information storage technologies. For example, memory 220 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

Radio 230 can include circuitry arranged for wireless communication (e.g., baseband circuitry, physical layer circuitry, etc.) arranged to send and receive signals indicating messages communicated over V2X network 130. Antennas 240 can be any of a variety of different antennas arranged to attenuate the signals generated by radios 230.

FIGS. 3-7 illustrate techniques implementable by devices to provide secure privacy preserving V2X communication in a platoon as described herein. The techniques described in these figures can be implemented by a system, such as, system 100. The disclosure uses the components of system 100 to describe these figures in greater detail. However, it is noted that the techniques can be implemented by a system with a different configuration that that depicted in FIG. 1.

Furthermore, any device (e.g., vehicles 110, RSU 140, or the like) can communicate in platoon 150. As such, these figures refer to the devices in platoon 150 as UEs for convenience. Furthermore, these figures make reference to UE 200 for convenience of description. It is to be appreciated that UEs as referenced herein can be a vehicle 110, an RSU 140, or other devices arranged for V2X communication as described herein. These figures depict N UEs 200 and M service coordinators 170 where M, N are greater than or equal to 1.

Figure 3:
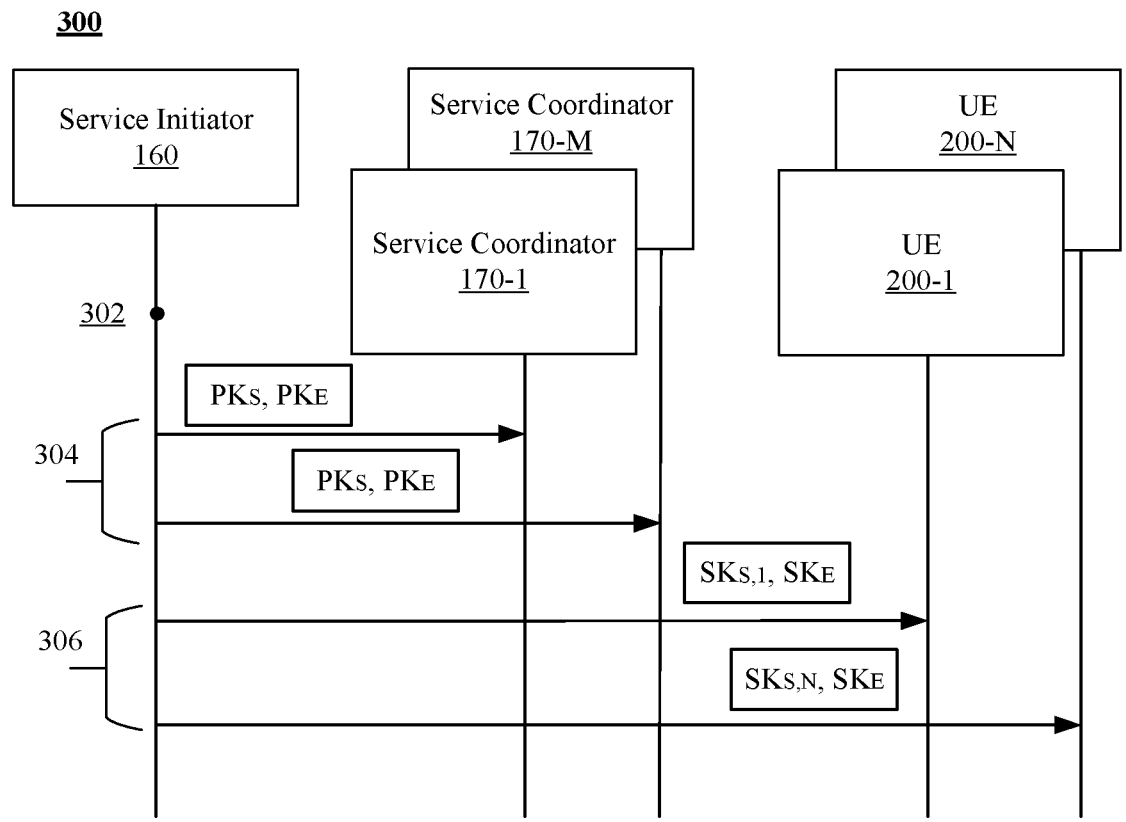
FIG. 3 illustrates a technique to provision ring keys for platoon communication.

Turning more particularly to FIG. 3, technique 300 for provisioning UEs is depicted. At time 302, service initiator 160 generates a ring signature key set comprising a ring signature public-key $PK_S$ and N ring signature private-keys $SK_{s,i}$, for i $\in$[1 . . . N], which are all associated with $PK_S$. Furthermore, at time 302, service initiator 160 generates a public-key encryption key pair comprising a public-key $PK_E$ for encryption and a private-key $SK_E$ for decryption. For example, at time 302, processor 164 can execute instructions 168 to generate ring keys 162 where ring keys 162 include the above described key set and key pair.

At time 304, service initiator 160 distributes ones of the generated keys to service coordinators 170. In particular, at time 304, service initiator 160 distributes the public keys $PK_E$ and $PK_S$ to the service coordinators 170. For example, processor 164 in executing instructions 168 can cause an information element comprising indications of the ring signature public-key $PK_S$ from the ring signature key set and the public-key $PK_E$ from the public-key encryption key pair generated at time 302 to service coordinators 170. Furthermore, at time 304, service coordinators 170 can receive an information element comprising indications of the public keys ($PK_E$, $PK_S$) and store the keys in memory 176.

At time 306, service initiator 160 distributes ones of the generated keys to UEs 200. In particular, at time 306, service initiator 160 distributes private-keys $SK_{s,i}$ and $SK_E$ to the UEs 200. For example, processor 164 in executing instructions 168 can cause an information element comprising indications of a one of the ring signature private-keys $SK_{s,i}$, where i corresponds to one of the UEs 200-1 to 200-N from the ring signature key set and the private-key $SK_E$ from the public-key encryption key pair generated at time 302 to UEs 200-1 to 200-N. Furthermore, at time 304, UEs 200 can receive an information element comprising indications of the private keys ($SK_{s,i}$, $SK_E$) and store the keys in memory 220. It is noted, that each one of UEs 200 receives a separate one of the ring signature private-keys $SK_{s,i}$. For example, this figure depicts UE 200-1 receiving the ring signature private-key $SK_{s,1}$ while UE 200-N receives the ring signature private-key $SK_{s,N}$.

Figure 4:
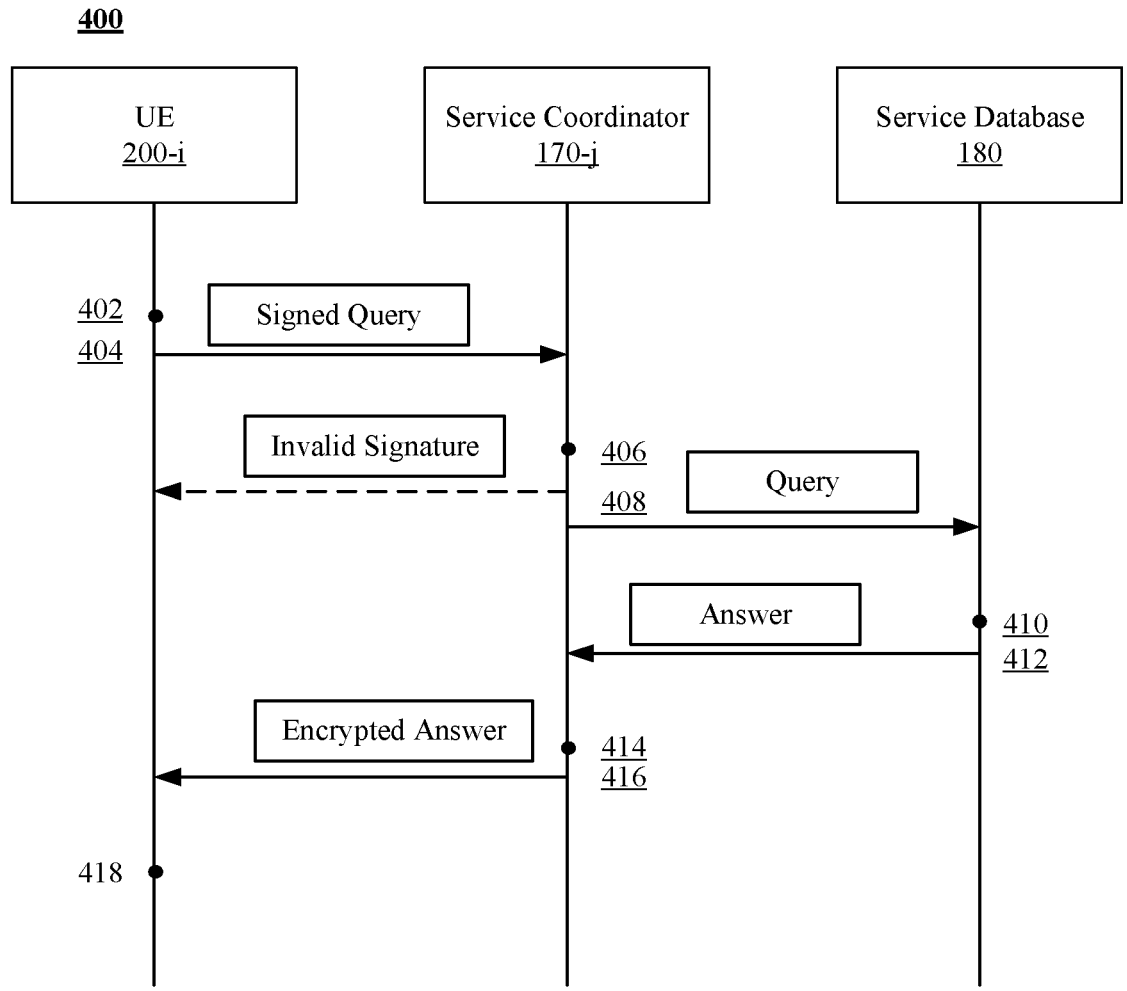
FIG. 4 illustrates a technique to discover a platoon.

Turning more particularly to FIG. 4, technique 400 for platoon discovery is depicted. At time 402, a UE 200 (e.g. UE 200-i, where i $\in$[1 . . . N]) generates a query to check with a service coordinator 170 whether there is a platoon already formed with which UE 200-i could join. In some examples, the query generated at time 402 can include an indication of platoon characteristics (e.g., direction, current location, minimum speed, maximum speed, destination, etc.). UE 200-i signs the query with the ring signature private-keys $SK_{s,i}$ and is represented as σ herein. For example, σ=$Sign_{SK_{s,i}}$(direction, min_speed, max_speed). For example, at time 402, processor 210 can execute instructions 222 to generate a query σ and sign the query with ring key 162 (e.g., private-key $SK_{s,i}$).

At time 404, UE 200-i transmits an information element comprising an indication of the query σ to a service coordinator 170 (e.g. service coordinator 170-j, where j $\in$[1 . . . M]). At time 404, service coordinator 170-j receives the information including the indication of the query σ. For example, processor 210 can execute instructions 222 to cause radio 230 and antenna 240 to transmit signals corresponding to query σ to service coordinator 170 via V2X network 130.

At time 406, service coordinator 170-j can verify (or authenticate) the signature of query σ using the ring signature public-key $PK_S$ from the ring signature key set. Based on whether the signature is valid, the service coordinator 170-j can either query the service database 180 with the query or can return an indication to the UE 200-i that the signature is invalid. For example, at time 408, processor 174 in executing instructions 178 can either return an indication to UE 200-i that the signature is invalid or can forward the query to service database 180. At time 408, the UE 200-i or the service database 180 can receive the indication from service coordinator 170-j.

Where the signature is valid and the service coordinator 170-j forwards the query to the service database 180 at time 408, technique 400 can proceed to time 410. However, where the signature is invalid and the service coordinator 170-j sends an indication of such to the UE 200-i, the technique 400 can end.

At time 410, service database 180 can process the query and at time 412 can return an answer to the service coordinator 170-j. For example, where a platoon 150 meeting the requirements of the query exists, service database 180 can return an answer to the service coordinator 170-j indicating that a platoon exists and providing an indication of the platoon ID. However, where a platoon meeting the requirements of the query does not exist, service database 180 can return a null answer to the service coordinator 170-j indication that no matching platoon exists. At time 412, the service coordinator 170-j can receive the answer from the service database 180.

At time 414, service coordinator 170-j can generate a response to the initial query receive at time 404 and can encrypt the response with the public-key $PK_E$ from the public-key encryption key pair. For example, processor 174 can execute instructions 178 to generate a response including an indication that a platoon exists and the platoon ID or an indication that no platoon exists and can encrypt the response with the public-key $PK_E$ from the public-key encryption key pair. At time 416, service coordinator 170-j can send an information element including indications of the encrypted answer to UE 200-i. For example, processor 174 can execute instructions 178 to cause interconnect circuitry of service coordinator 170-j to transmit signals corresponding to the encrypted answer to UE 200-i via V2X network 130. At time 416, UE 200-i can receive the encrypted answer.

At time 418, UE 200-i can decrypt the encrypted answer with the private-key $SK_E$ from the public-key encryption key pair. For example, processor 210 in executing instructions 222 can decrypt the encrypted answer with the private-key $SK_E$ from the public-key encryption key pair.

Figure 5:
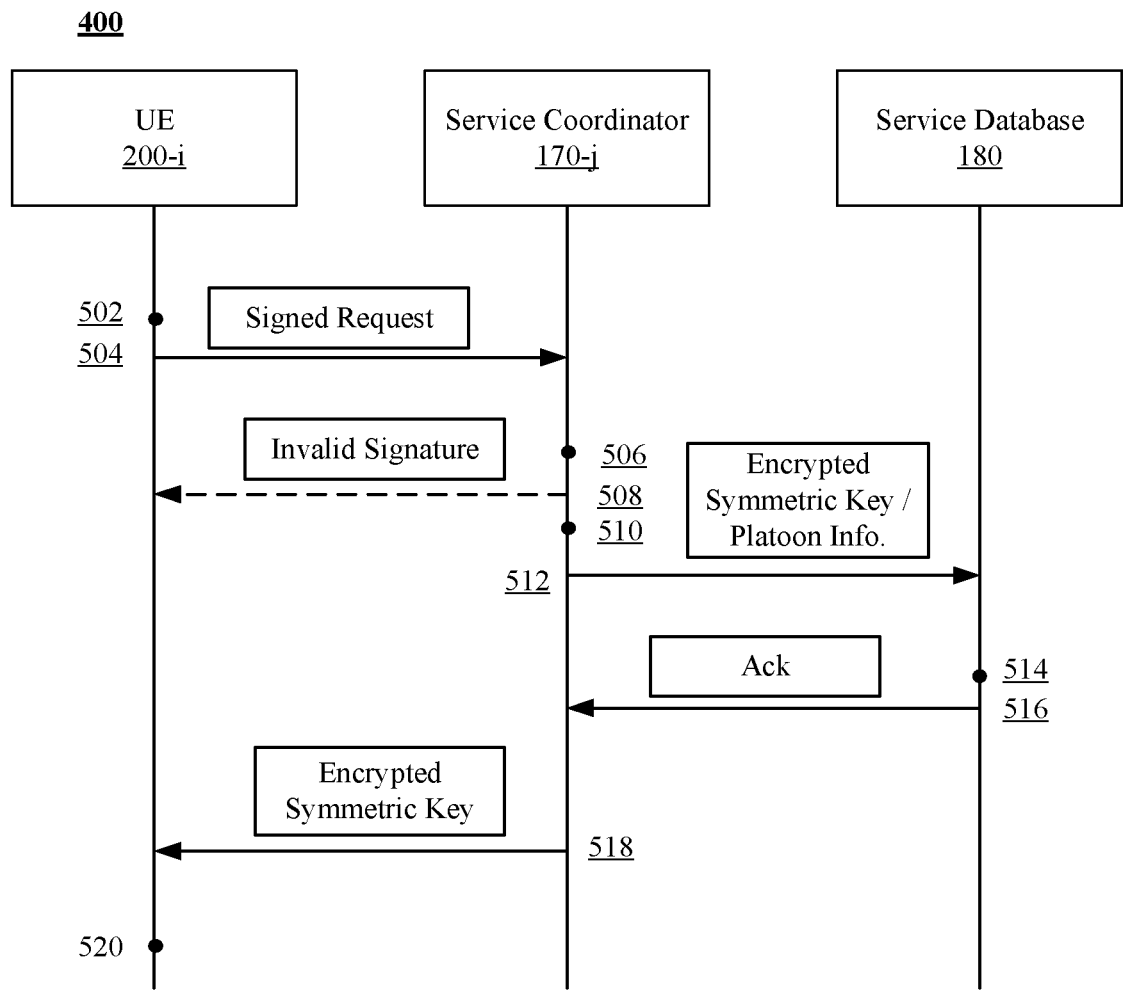
FIG. 5 illustrates a technique to form a platoon.
Figure 6:
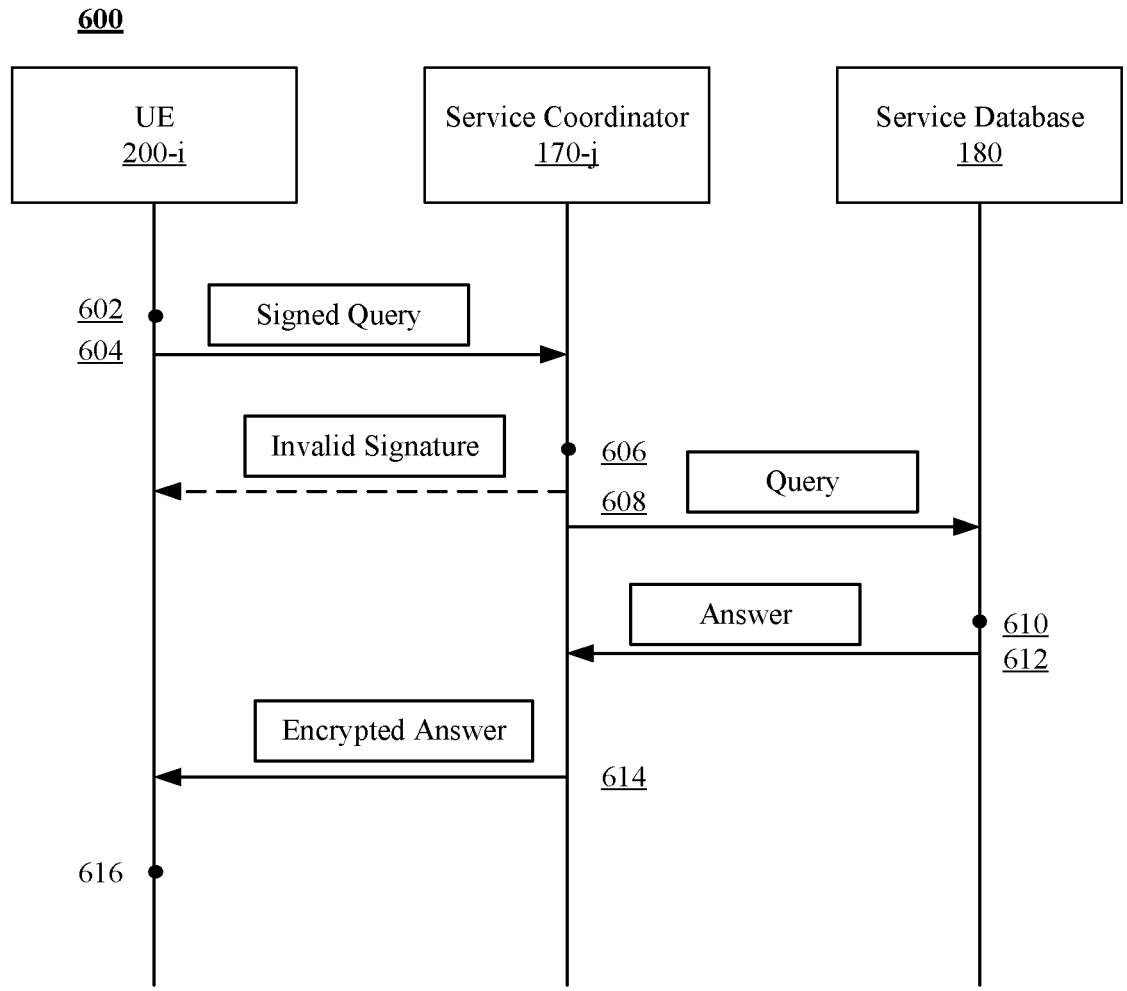
FIG. 6 illustrates a technique to join a platoon.

From time 418, UE 200-i can either join a platoon 150 or form a new platoon 150. For example, where the decrypted answer includes an indication that no matching platoon exists, UE 200-i can request to form a new platoon. This is depicted in FIG. 5. However, where the decrypted answer includes an indication of the existence of a platoon 150 and a platoon ID, UE 200-i can request to join the platoon. This is depicted in FIG. 6.

Turning more particularly to FIG. 5, technique 500 for platoon formation is depicted. At time 502, a UE 200 (e.g. UE 200-i, where i ∈[1 . . . N]) generates a request to form a new platoon 150. In some examples, the request generated at time 502 can include an indication of platoon characteristics (e.g., direction, current location, minimum speed, maximum speed, destination, etc.). UE 200-i signs the request with the ring signature private-keys SKs,i. The request is σR herein. For example, σR=$Sign_{SKs,i}$ (direction, min_speed, max_speed). For example, at time 502, processor 210 can execute instructions 222 to generate and sign a request with ring key 162 (e.g., private-key $SK_{s,i}$).

At time 504, UE 200-i transmits an information element comprising an indication of the request σR to a service coordinator 170 (e.g. service coordinator 170-j, where j ∈[1 . . . M]). At time 504, service coordinator 170-j receives the information including the indication of the request σR. For example, processor 210 can execute instructions 222 to cause radio 230 and antenna 240 to transmit signals corresponding to request σR to service coordinator 170 via V2X network 130.

At time 506, service coordinator 170-j can verify (or authenticate) the signature of the request σR using the ring signature public-key $PK_S$ from the ring signature key set. Based on whether the signature is valid, the service coordinator 170-j can either proceed to form the platoon (e.g., proceed to times 510 to 520) or can return an indication to the UE 200-i that the signature is invalid. For example, at time 508, processor 174 in executing instructions 178 can return an indication to UE 200-i that the signature is invalid. At time 408, the UE 200-i can receive the indication from service coordinator 170-j.

At time 510, where the signature is valid, the service coordinator 170-j can generate a symmetric key P-SK and can encrypt the symmetric key using the public-key $PK_E$ from the public-key encryption key pair. Furthermore, at time 510, service coordinator 170-j can generate a command including an indication to store the encrypted symmetric key P-SK along with indications of characteristic of the platoon 150 to the service database 180. For example, processor 174 can execute instructions 178 to generate a symmetric key (e.g., based on a ring key algorithm, or the like), encrypt the generated symmetric key P-SK with public-key $PK_E$ and generate a command to store the encrypted key in service database 180.

At time 512, service coordinator 170-j can send the command (e.g., Store($ENC_{PKE}$(P-SK), direction, speed, location, time, etc.)). At time 512, the service database 180 can receive the command from the service coordinator 170-j. At time 514, the service database 180 can execute the command received at time 512. For example, the service database can create an entry for a new platoon and store the encrypted symmetric key P-SK along with the platoon characteristics and associate the new entry with a platoon ID. At time 516, the service database 180 can send an acknowledgment of success (or failure) of the command to service coordinator 1870-j. Assuming acknowledgment received by service coordinator 170-j at time 516, technique 500 can proceed to time 518.

At time 518 service coordinator 170-j can send an information element including an indication of the encrypted symmetric key (e.g., $ENC_{PKE}$(P-SK)) to the UE 200-i. For example, processor 174 can execute instructions 178 to cause interconnect circuitry of service coordinator 170-j to transmit signals corresponding to the encrypted symmetric key to UE 200-i via V2X network 130. At time 518, UE 200-i can receive the encrypted symmetric key.

At time 520, UE 200-i can decrypt the encrypted symmetric key with the private-key $SK_E$ from the public-key encryption key pair. For example, processor 210 in executing instructions 222 can decrypt the encrypted symmetric key with the private-key $SK_E$ from the public-key encryption key pair.

Turning more particularly to FIG. 6, technique 600 for joining an existing platoon is depicted. At time 602, a UE 200 (e.g. UE 200-i, where i ∈[1 ... N]) generates a query to request a symmetric key P-SK associated with a platoon ID (e.g., platoon ID received at time 416 of technique 400 in FIG. 4, or the like). UE 200-i can sign the query with the ring signature private-keys $SK_{s,i}$ and is represented as σJ herein. For example, σJ=$Sign_{SKs,i}$ (Platoon ID). For example, at time 602, processor 210 can execute instructions 222 to generate a query and sign the query with ring key 162 (e.g., private-key $SK_{s,i}$).

At time 604, UE 200-i transmits an information element comprising an indication of the query σJ to a service coordinator 170 (e.g. service coordinator 170-j, where j ∈[1 ... M]). At time 604, service coordinator 170-j receives the information including the indication of the query σJ. For example, processor 210 can execute instructions 222 to cause radio 230 and antenna 240 to transmit signals corresponding to query σJ to service coordinator 170 via V2X network 130.

At time 606, service coordinator 170-j can verify (or authenticate) the signature of query σJ using the ring signature public-key $PK_S$ from the ring signature key set. Based on whether the signature is valid, the service coordinator 170-j can either query the service database 180 with the query or can return an indication to the UE 200-i that the signature is invalid. For example, at time 608, processor 174 in executing instructions 178 can either return an indication to UE 200-i that the signature is invalid or can forward the query to service database 180. At time 608, the UE 200-i or the service database 180 can receive the indication from service coordinator 170-j.

Where the signature is valid and the service coordinator 170-j forwards the query to the service database 180 at time 608, technique 600 can proceed to time 610. However, where the signature is invalid and the service coordinator 170-j sends an indication of such to the UE 200-i, the technique 600 can end.

At time 610, service database 180 can process the query and at time 612 can return an answer to the service coordinator 170-j. For example, where a platoon 150 matching the platoon ID in the query exists, service database 180 can return an answer to the service coordinator 170-j indicating the encrypted symmetric key (e.g., $ENC_{PKE}$(P-SK)) associated with the platoon ID in the query. However, where a platoon having the platoon ID in the query does not exist, service database 180 can return a null answer to the service coordinator 170-j indication that no such platoon ID exists. At time 512, the service coordinator 170-j can receive the answer from the service database 180.

At time 614, service coordinator 170-j can send an information element including indications of the encrypted symmetric key (e.g., $ENC_{PKE}$(P-SK)) to UE 200-i. For example, processor 174 can execute instructions 178 to cause interconnect circuitry of service coordinator 170-j to transmit signals corresponding to the encrypted symmetric key to UE 200-i via V2X network 130. At time 614, UE 200-i can receive the encrypted symmetric key.

At time 616, UE 200-i can decrypt the encrypted symmetric key with the private-key $SK_E$ from the public-key encryption key pair. For example, processor 210 in executing instructions 222 can decrypt the encrypted symmetric key with the private-key $SK_E$ from the public-key encryption key pair.

Given the symmetric key P-SK, a UE (e.g., UE 200-i, or the like) can communicate with other UEs 200 of a platoon 150. For example, UEs 200 in the platoon 150 can exchange encrypted messages based on the symmetric key P-SK and a block cypher algorithm (e.g., AES-128, or the like). As another example, UEs 200 in a platoon 150 can exchange authenticated messages to ensure that (1) message comes from the expected source and 2) the message has not been changed in transit. For example, UEs in the platoon can authenticate messages based on the symmetric key P-SK and a message authentication code (e.g., Cipher-based Message Authentication Code (CMAC), keyed-Hash Message Authentication Code (HMAC), or the like). As another example, UEs 200 in a platoon 150 can exchange authenticated encrypted messages while preserving confidentiality and authenticity of the messages based on the symmetric key P-SK and an authenticated encryption algorithm (e.g., Counter-with-CBC-MAC (CCM), or the like).

Figure 7:
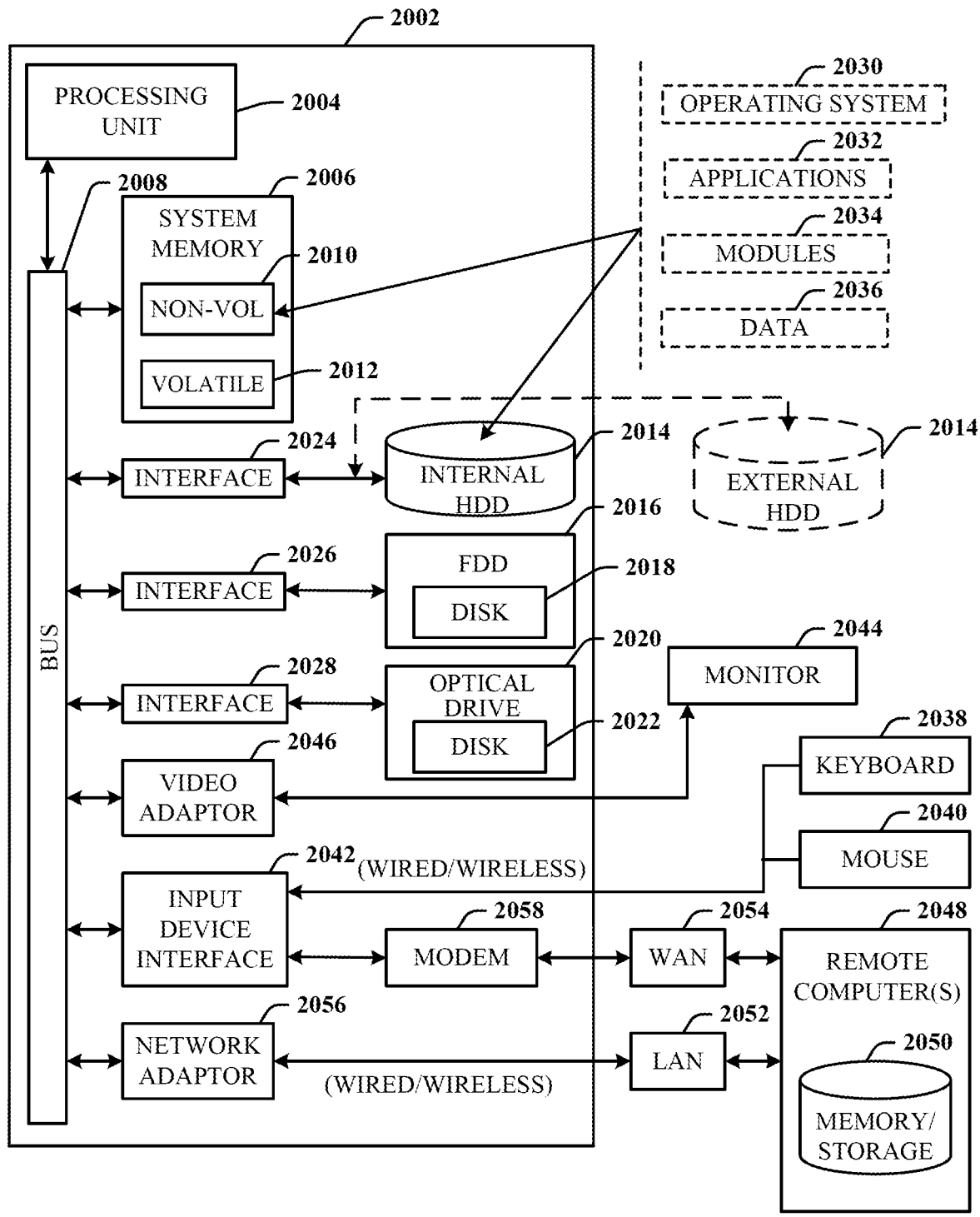
FIG. 7 illustrates an example computing architecture.

FIG. 7 illustrates an example computing architecture 2000 (e.g., of a computing device, such as a computer, laptop, tablet computer, mobile computer, smartphone, vehicle-based computing system, etc.) suitable for implementing various embodiments as previously described. Moreover, the computing device may be a computing device in a vehicle. In one embodiment, the computing architecture 2000 may include or be implemented as part of a system, which will be further described below. In examples, the computing architecture 2000 of the one or more computing devices and the processing circuitries thereof may be configured as components of a vehicle, such as, one of vehicles 110.

As used in this application, the terms "system" and "component" are intended to refer to a computer-related entity, either hardware, a combination of hardware and software, software, or software in execution, examples of which are provided by the exemplary computing architecture 2000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2000.

As shown in this figure, the computing architecture 2000 includes a processing unit 2004, a system memory 2006 and a system bus 2008. The processing unit 2004 can be any of various commercially available processors.

The system bus 2008 provides an interface for system components including, but not limited to, the system memory 2006 to the processing unit 2004. The system bus 2008 can be any of several types of bus structure that may further interconnect to a memory bus (with or without a memory controller), a peripheral bus, and a local bus using any of a variety of commercially available bus architectures. Interface adapters may connect to the system bus 2008 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2000 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 2006 can include non-volatile memory 2010 and/or volatile memory 2012. A basic input/output system (BIOS) can be stored in the non-volatile memory 2010.

The computer 2002 may include various types of computer-readable storage media in the form of one or more lower speed memory units, including an internal (or external) hard disk drive (HDD) 2014, a magnetic floppy disk drive (FDD) 2016 to read from or write to a removable magnetic disk 2018, and an optical disk drive 2020 to read from or write to a removable optical disk 2022 (e.g., a CD-ROM or DVD). The HDD 2014, FDD 2016 and optical disk drive 2020 can be connected to the system bus 2008 by a HDD interface 2024, an FDD interface 2026 and an optical drive interface 2028, respectively. The HDD interface 2024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2010, 2012, including an operating system 2030, one or more application programs 2032, other program modules 2034, and program data 2036. In one embodiment, the one or more application programs 2032, other program modules 2034, and program data 2036 can include, for example, the various applications and/or components of the system 700.

A user can enter commands and information into the computer 2002 through one or more wire/wireless input devices, for example, a keyboard 2038 and a pointing device, such as a mouse 2040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 2004 through an input device interface 2042 that is coupled to the system bus 2008, but can be connected by other interfaces such as a parallel port, IEEE 1394 serial port, a game port, a USB port, an IR interface, and so forth.

A monitor 2044 or other type of display device is also connected to the system bus 2008 via an interface, such as a video adaptor 2046. The monitor 2044 may be internal or external to the computer 2002. In addition to the monitor 2044, a computer typically includes other peripheral output devices, such as speakers, printers, and so forth.

The computer 2002 may operate in a networked environment using logical connections via wire and/or wireless communications to one or more remote computers, such as a remote computer 2048. The remote computer 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wire/wireless connectivity to a local area network (LAN) 2052 and/or larger networks, for example, a wide area network (WAN) 2054. Such LAN and WAN networking environments are commonplace in offices and companies, and facilitate enterprise-wide computer networks, such as intranets, all of which may connect to a global communications network, for example, the Internet.

When used in a LAN networking environment, the computer 2002 is connected to the LAN 2052 through a wire and/or wireless communication network interface or adaptor 2056. The adaptor 2056 can facilitate wire and/or wireless communications to the LAN 2052, which may also include a wireless access point disposed thereon for communicating with the wireless functionality of the adaptor 2056.

When used in a WAN networking environment, the computer 2002 can include a modem 2058, or is connected to a communications server on the WAN 2054, or has other means for establishing communications over the WAN 2054, such as by way of the Internet. The modem 2058, which can be internal or external and a wire and/or wireless device, connects to the system bus 2008 via the input device interface 2042. In a networked environment, program modules depicted relative to the computer 2002, or portions thereof, can be stored in the remote memory/storage device 2050. It will be appreciated that the network connections shown are exemplary and other means of establishing a communications link between the computers can be used.

The computer 2002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of computing device may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
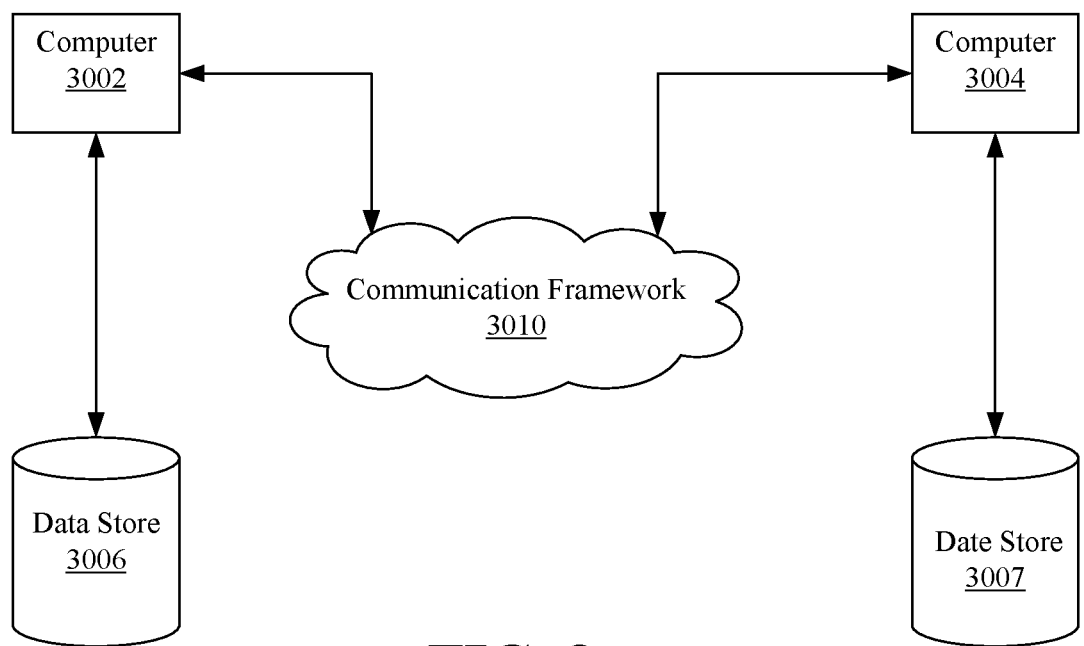
FIG. 8 illustrates an example communications architecture.

FIG. 8 illustrates an exemplary communications architecture 3000 suitable for implementing various embodiments. For example, one or more computing devices may communicate with each other via a communications framework 3010, which may be a network implemented to facilitate V2X communications, for example, to securely and/or privately communicate in a platoon as described herein.

The communications architecture 3000 includes various common communications elements, such as a transmitter, receiver, transceiver, radio, network interface, baseband processor, antenna, amplifiers, filters, power supplies, and so forth. The embodiments, however, are not limited to implementation by the communications architecture 3000.

As shown in this figure, the communications architecture 3000 includes a computer 3002 and a computer 3004, which are operatively connected to one or more respective client data stores 3006 and 3007 that can be employed to store information local to the respective computers 3002 and servers 3004, such as cookies and/or associated contextual information. Furthermore, computers 3002 and 3004 may be like, or include features like, computing architecture 400.

Computers 3002 and 3004 may communicate information between each other using a communication framework 3010. In one example, computer 3002 may be implemented or configured in an RSU, and further, computer 3004 may be implemented or configured in a vehicle. The communications framework 3010 may implement any well-known communications techniques and protocols. The communications framework 3010 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 3010 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computers 3002 and 3004. A communications network may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1

An apparatus, comprising: memory to store instructions; and processing circuitry coupled to the memory, the processing circuitry operable to execute the instructions, which when executed cause the processing circuitry to: generate a query including at least one platoon characteristic; sign the query with a first private key from a key-set; transmit the signed query to a service coordinator computing device via a vehicle-to-anything (V2X) network; receive, from the service coordinator computing device, an encrypted answer to the query; and decrypt the answer with a second private key from a key-pair.

Example 2

The apparatus of example 1, the instructions, when executed by the processing circuitry cause the processing circuitry to determine whether a platoon matching the at least one platoon characteristic exists based on the decrypted answer.

Example 3

The apparatus of example 2, the instructions, when executed by the processing circuitry cause the processing circuitry to: generate a request to form a platoon based on a determination that a platoon matching the at least one platoon characteristic does not exist, the request comprising an indication of the at least one platoon characteristic; sign the request with the first private key; transmit the signed request to the service coordinator computing device via the V2X network; receive, from the service coordinator computing device, an encrypted symmetric key; and decrypt the symmetric key with the second private key.

Example 4

The apparatus of example 3 the instructions, when executed by the processing circuitry cause the processing circuitry to: generate a message; encrypt the message with the symmetric key; and transmit the encrypted message to one or more user equipment in the platoon via the V2X network.

Example 5

The apparatus of example 2, the instructions, when executed by the processing circuitry cause the processing circuitry to: identify a platoon identification (ID) from the decrypted answer based on a determination that a platoon matching the at least one platoon characteristic exists; generate a second query including an indication of the platoon ID; sign the second query with the first private key; transmit the signed second query to the service coordinator computing device via the V2X network; receive, from the service coordinator computing device, an encrypted symmetric key; and decrypt the symmetric key with the second private key.

Example 6

The apparatus of example 1, the instructions, when executed by the processing circuitry cause the processing circuitry to receive an indication the signature of the signed query is invalid from the service coordinator computing device.

Example 7

The apparatus of example 1, the instructions, when executed by the processing circuitry cause the processing circuitry to receive the first private key and the second private key from a service initiator computing device.

Example 8

The apparatus of example 1, the at least one characteristic comprising a direction, a minimum speed, or a maximum speed.

Example 9

The apparatus of example 1, the key-set comprising a plurality of private keys and a public key, the first private key a one of the plurality of private keys.

Example 10

The apparatus of example 1, the key-pair comprising the second private key and a key-pair public key.

Example 11

At least one machine-readable storage medium comprising instructions that when executed by at least one processor, cause the at least one processor to: generate a query including at least one platoon characteristic; sign the query with a first private key from a key-set; transmit the signed query to a service coordinator computing device via a vehicle-to-anything (V2X) network; receive, from the service coordinator computing device, an encrypted answer to the query; and decrypt the answer with a second private key from a key-pair.

Example 12

The at least one machine-readable storage medium of example 11, the instructions, when executed, cause the at least one processor to determine whether a platoon matching the at least one platoon characteristic exists based on the decrypted answer.

Example 13

The at least one machine-readable storage medium of example 12, the instructions, when executed, cause the at least one processor to: generate a request to form a platoon based on a determination that a platoon matching the at least one platoon characteristic does not exist, the request comprising an indication of the at least one platoon characteristic; sign the request with the first private key; transmit the signed request to the service coordinator computing device via the V2X network; receive, from the service coordinator computing device, an encrypted symmetric key; and decrypt the symmetric key with the second private key.

Example 14

The at least one machine-readable storage medium of example 13, the instructions, when executed, cause the at least one processor to: generate a message; encrypt the message with the symmetric key; and transmit the encrypted message to one or more user equipment in the platoon via the V2X network.

Example 15

The at least one machine-readable storage medium of example 12, the instructions, when executed, cause the at least one processor to: identify a platoon identification (ID) from the decrypted answer based on a determination that a platoon matching the at least one platoon characteristic exists; generate a second query including an indication of the platoon ID; sign the second query with the first private key; transmit the signed second query to the service coordinator computing device via the V2X network; receive, from the service coordinator computing device, an encrypted symmetric key; and decrypt the symmetric key with the second private key.

Example 16

The at least one machine-readable storage medium of example 11, the instructions, when executed, cause the at least one processor to receive an indication the signature of the signed query is invalid from the service coordinator computing device.

Example 17

The at least one machine-readable storage medium of example 11, the instructions, when executed, cause the at least one processor to receive the first private key and the second private key from a service initiator computing device.

Example 18

The at least one machine-readable storage medium of example 11, the at least one characteristic comprising a direction, a minimum speed, or a maximum speed.

Example 19

The at least one machine-readable storage medium of example 11, the key-set comprising a plurality of private keys and a public key, the first private key a one of the plurality of private keys.

Example 20

The at least one machine-readable storage medium of example 11, the key-pair comprising the second private key and a key-pair public key.

Example 21

A method, comprising: generating a query including at least one platoon characteristic; signing the query with a first private key from a key-set; transmitting the signed query to a service coordinator computing device via a vehicle-to-anything (V2X) network; receiving, from the service coordinator computing device, an encrypted answer to the query; and decrypting the answer with a second private key from a key-pair.

Example 22

The method of example 21, comprising determining whether a platoon matching the at least one platoon characteristic exists based on the decrypted answer.

Example 23

The method of example 22, comprising: generating a request to form a platoon based on a determination that a platoon matching the at least one platoon characteristic does not exist, the request comprising an indication of the at least one platoon characteristic; signing the request with the first private key; transmitting the signed request to the service coordinator computing device via the V2X network; receiving, from the service coordinator computing device, an encrypted symmetric key; and decrypting the symmetric key with the second private key.

Example 24

The method of example 23, comprising: generating a message; encrypting the message with the symmetric key; and transmitting the encrypted message to one or more user equipment in the platoon via the V2X network.

Example 25

The method of example 22, comprising: identifying a platoon identification (ID) from the decrypted answer based on a determination that a platoon matching the at least one platoon characteristic exists; generating a second query including an indication of the platoon ID; signing the second query with the first private key; transmitting the signed second query to the service coordinator computing device via the V2X network; receiving, from the service coordinator computing device, an encrypted symmetric key; and decrypting the symmetric key with the second private key.

Example 26

The method of example 21, comprising receiving an indication the signature of the signed query is invalid from the service coordinator computing device.

Example 27

The method of example 21, comprising receiving the first private key and the second private key from a service initiator computing device.

Example 28

The method of example 21, the at least one characteristic comprising a direction, a minimum speed, or a maximum speed.

Example 29

The method of example 21, the key-set comprising a plurality of private keys and a public key, the first private key a one of the plurality of private keys.

Example 30

The method of example 21, the key-pair comprising the second private key and a key-pair public key.

Example 31

An apparatus, comprising means arranged to implement the function of any one of examples 21 to 30.

Example 32

A system, comprising: a service database comprising indications of a platoon, a platoon identification (ID) associated with the platoon, at least one platoon characteristic associated with the platoon, and an encrypted symmetric key associated with the platoon; at least one service coordinator computing device comprising: memory to store instructions; and processing circuitry coupled to the memory, the processing circuitry operable to execute the instructions, which when executed cause the processing circuitry to: receive a signed query from a user equipment (UE) via a vehicle-to-anything (V2X) network, the signed query comprising an indication of the least one platoon characteristic; validate the signature of the signed query with a first public key from a key-set; query the service database for a platoon ID associated with a platoon having the at least one characteristic; receive an answer to the query from the service database; encrypt the answer with a second public key from a key pair; and transmit the encrypted answer to the UE via the V2X network.

Example 33

The system of example 32, the instructions, when executed by the processing circuitry cause the processing circuitry to: determine whether the signature of the signed query is valid; and query the service database for a platoon ID associated with a platoon having the at least one characteristic based on a determination that the signature is valid; or send an indication the signature is invalid to the UE.

Example 34

The system of example 32, the instructions, when executed by the processing circuitry cause the processing circuitry to: receive a signed request to form a platoon from the UE; validate the signature of the signed request using the first public key; generate a symmetric key; encrypt the symmetric key with the second public key; send a command to the service database including an indication of the encrypted symmetric key, to store the encrypted symmetric key, and to associate the encrypted symmetric key with a new platoon ID; and transmit the encrypted symmetric key to the UE via the V2X network.

Example 35

The system of example 34, the request comprising an indication of at least one platoon characteristic and the command including an indication of the at least one platoon characteristic.

Example 36

The system of example 32, the instructions, when executed by the processing circuitry cause the processing circuitry to: receive a second signed query from the UE via the V2X network, the second signed query comprising an indication of the platoon ID; validate the signature of the second signed query with the first public key; query the service database for an encrypted symmetric key associated with the platoon having platoon ID; transmit the encrypted symmetric key to the UE via the V2X network.

Example 37

The system of example 32, the instructions, when executed by the processing circuitry cause the processing circuitry to receive the first public key and the second public key from a service initiator computing device.

Example 38

The system of example 32, the at least one platoon characteristic comprising a direction, a minimum speed, or a maximum speed.

Example 39

At least one non-transitory computer-readable storage medium comprising instructions that when executed by processing circuitry, cause the processing circuitry to: receive a signed query from a user equipment (UE) via a vehicle-to-anything (V2X) network, the signed query comprising an indication of the least one platoon characteristic; validate the signature of the signed query with a first public key from a key-set; query a service database for a platoon ID associated with a platoon having the at least one characteristic, the service database comprising indications of a platoon, a platoon identification (ID) associated with the platoon, at least one platoon characteristic associated with the platoon, and an encrypted symmetric key associated with the platoon; receive an answer to the query from the service database; encrypt the answer with a second public key from a key pair; and transmit the encrypted answer to the UE via the V2X network.

Example 40

The non-transitory computer-readable storage medium of example 39, comprising instructions that when executed by the processing circuitry, cause the processing circuitry to: determine whether the signature of the signed query is valid; and query the service database for a platoon ID associated with a platoon having the at least one characteristic based on a determination that the signature is valid; or send an indication the signature is invalid to the UE.

Example 41

The non-transitory computer-readable storage medium of example 39, the instructions, when executed by the processing circuitry cause the processing circuitry to: receive a signed request to form a platoon from the UE; validate the signature of the signed request using the first public key; generate a symmetric key; encrypt the symmetric key with the second public key; send a command to the service database including an indication of the encrypted symmetric key, to store the encrypted symmetric key, and to associate the encrypted symmetric key with a new platoon ID; and transmit the encrypted symmetric key to the UE via the V2X network.

Example 42

The non-transitory computer-readable storage medium of example 41, the request comprising an indication of at least one platoon characteristic and the command including an indication of the at least one platoon characteristic.

Example 43

The non-transitory computer-readable storage medium of example 39, the instructions, when executed by the processing circuitry cause the processing circuitry to: receive a second signed query from the UE via the V2X network, the second signed query comprising an indication of the platoon ID; validate the signature of the second signed query with the first public key; query the service database for an encrypted symmetric key associated with the platoon having platoon ID; transmit the encrypted symmetric key to the UE via the V2X network.

Example 44

The non-transitory computer-readable storage medium of example 39, the instructions, when executed by the processing circuitry cause the processing circuitry to receive the first public key and the second public key from a service initiator computing device.

Example 45

The non-transitory computer-readable storage medium of example 39, the at least one platoon characteristic comprising a direction, a minimum speed, or a maximum speed.

Example 46

A method, comprising: receiving a signed query from a user equipment (UE) via a vehicle-to-anything (V2X) network, the signed query comprising an indication of the least one platoon characteristic; validating the signature of the signed query with a first public key from a key-set; querying a service database for a platoon ID associated with a platoon having the at least one characteristic, the service database comprising indications of a platoon, a platoon identification (ID) associated with the platoon, at least one platoon characteristic associated with the platoon, and an encrypted symmetric key associated with the platoon; receiving an answer to the query from the service database; encrypting the answer with a second public key from a key pair; and transmitting the encrypted answer to the UE via the V2X network.

Example 47

The method of example 46, comprising: determining whether the signature of the signed query is valid; and querying the service database for a platoon ID associated with a platoon having the at least one characteristic based on a determination that the signature is valid; or sending an indication the signature is invalid to the UE.

Example 48

The method of example 46, comprising: receiving a signed request to form a platoon from the UE; validating the signature of the signed request using the first public key; generating a symmetric key; encrypting the symmetric key with the second public key; sending a command to the service database including an indication of the encrypted symmetric key, to store the encrypted symmetric key, and to associate the encrypted symmetric key with a new platoon ID; and transmitting the encrypted symmetric key to the UE via the V2X network.

Example 49

The method of example 48, the request comprising an indication of at least one platoon characteristic and the command including an indication of the at least one platoon characteristic.

Example 50

The method of example 46, comprising: receiving a second signed query from the UE via the V2X network, the second signed querying comprising an indication of the platoon ID; validating the signature of the second signed query with the first public key; querying the service database for an encrypted symmetric key associated with the platoon having platoon ID; transmitting the encrypted symmetric key to the UE via the V2X network.

Example 51

The method of example 46, comprising receiving the first public key and the second public key from a service initiator computing device.

Example 52

The method of example 46, the at least one platoon characteristic comprising a direction, a minimum speed, or a maximum speed.

Example 53

An apparatus, comprising means arranged to implement the function of any one of examples 46 to 52.

What is claimed is:

1. An apparatus, comprising:
  memory to store instructions; and
  processing circuitry coupled to the memory, the processing circuitry operable to execute the instructions, which when executed cause the processing circuitry to:
    generate a request to form a platoon;
    sign the request with a first private key;
    transmit the signed request to a service coordinator computing device via a vehicle-to-anything (V2X) network;
    receive, from the service coordinator computing device, an encrypted symmetric key;
    decrypt the symmetric key with a second private key;
    generate a query including at least one platoon characteristic;
    sign the query with the first private key;
    transmit the signed query to the service coordinator computing device via the V2X network;
    receive, from the service coordinator computing device, an encrypted answer to the query; and
    decrypt the answer with the second private key.

2. The apparatus of claim 1, the instructions, when executed by the processing circuitry cause the processing circuitry to:
  determine whether a platoon matching the at least one platoon characteristic exists based on the decrypted answer; and
  generate the request to form the platoon based on a determination that a platoon matching the at least one platoon characteristic does not exist, the request comprising an indication of the at least one platoon characteristic.

3. The apparatus of claim 1, the instructions, when executed by the processing
  circuitry cause the processing circuitry to:
    generate a message;
    encrypt the message with the symmetric key; and
    transmit the encrypted message to one or more user equipment in the platoon via the V2X network.

4. The apparatus of claim 2, the instructions, when executed by the processing circuitry cause the processing circuitry to:
  identify a platoon identification (ID) from the decrypted answer based on a determination that a platoon matching the at least one platoon characteristic exists;
  generate a second query including an indication of the platoon ID;
  sign the second query with the first private key;
  transmit the signed second query to the service coordinator computing device via the V2X network;
  receive, from the service coordinator computing device, an encrypted symmetric key; and
  decrypt the symmetric key with the second private key.

5. The apparatus of claim 1, the instructions, when executed by the processing circuitry cause the processing circuitry to receive an indication a signature of the signed query is invalid from the service coordinator computing device.

6. The apparatus of claim 1, the instructions, when executed by the processing circuitry cause the processing circuitry to receive the first private key and the second private key from a service initiator computing device.

7. The apparatus of claim 1, the at least one characteristic comprising a direction, a minimum speed, or a maximum speed.

8. The apparatus of claim 1, a key-set comprising a plurality of private keys and a public key, the first private key a one of the plurality of private keys.

9. The apparatus of claim 1, a key-pair comprising the second private key and a key-pair public key.

10. A system, comprising:
  a service database comprising indications of a platoon, a platoon identification (ID) associated with the platoon, at least one platoon characteristic associated with the platoon, and an encrypted symmetric key associated with the platoon;
  at least one service coordinator computing device comprising:
    memory to store instructions; and
    processing circuitry coupled to the memory, the processing circuitry operable to execute the instructions, which when executed cause the processing circuitry to:
      receive a signed query from a user equipment (UE) via a vehicle to-anything (V2X) network, the signed query comprising an indication of the least one platoon characteristic;
      validate the signature of the signed query with a first public key from a key-set;
      query the service database for a platoon ID associated with a platoon having the at least one characteristic;
      receive an answer to the query from the service database;
      encrypt the answer with a second public key from a key pair; and
      transmit the encrypted answer to the UE via the V2X network.

11. The system of claim 10, the instructions, when executed by the processing circuitry cause the processing circuitry to:
  determine whether a signature of the signed query is valid; and
  query the service database for a platoon ID associated with a platoon having the at least one characteristic based on a determination that the signature is valid; or
  send an indication the signature is invalid to the UE.

12. The system of claim 10, the instructions, when executed by the processing circuitry cause the processing circuitry to:
  receive a signed request to form a platoon from the UE;
  validate a signature of the signed request using the first public key;
  generate a symmetric key;
  encrypt the symmetric key with the second public key;
  send a command to the service database including an indication of the encrypted symmetric key, to store the encrypted symmetric key, and to associate the encrypted symmetric key with a new platoon ID; and
  transmit the encrypted symmetric key to the UE via the V2X network.

13. The system of claim 12, the request comprising an indication of at least one platoon characteristic and the command including an indication of the at least one platoon characteristic.

14. The system of claim 10, the instructions, when executed by the processing circuitry cause the processing circuitry to:
  receive a second signed query from the UE via the V2X network, the second signed query comprising an indication of the platoon ID;

validate a signature of the second signed query with the first public key;
query the service database for an encrypted symmetric key associated with the platoon having platoon ID;
transmit the encrypted symmetric key to the UE via the V2X network.

15. The system of claim 10, the instructions, when executed by the processing circuitry cause the processing circuitry to receive the first public key and the second public key from a service initiator computing device.

16. The system of claim 10, the at least one platoon characteristic comprising a direction, a minimum speed, or a maximum speed.

17. At least one non-transitory machine-readable storage medium comprising instructions that when executed by at least one processor, cause the at least one processor to:
generate a request to form a platoon;
sign the request with a first private key;
transmit the signed request to a service coordinator computing device via a vehicle-to-anything (V2X) network;
receive, from the service coordinator computing device, an encrypted symmetric key;
decrypt the symmetric key with a second private key;
generate a query including at least one platoon characteristic;
sign the query with the first private key;
transmit the signed query to the service coordinator computing device via the V2X network;
receive, from the service coordinator computing device, an encrypted answer to the query; and
decrypt the answer with the second private key.

18. The at least one non-transitory machine-readable storage medium of claim 17, the instructions, when executed, cause the at least one processor to:
determine whether a platoon matching the at least one platoon characteristic exists based on the decrypted answer; and
generate the request to form the platoon based on a determination that a platoon matching the at least one platoon characteristic does not exist, the request comprising an indication of the at least one platoon characteristic.

19. The at least one non-transitory machine-readable storage medium of claim 17, the instructions, when executed, cause the at least one processor to:
generate a message;
encrypt the message with the symmetric key; and
transmit the encrypted message to one or more user equipment in the platoon via the V2X network.

20. The at least one non-transitory machine-readable storage medium of claim 18, the instructions, when executed, cause the at least one processor to:
identify a platoon identification (ID) from the decrypted answer based on a determination that a platoon matching the at least one platoon characteristic exists;
generate a second query including an indication of the platoon ID;
sign the second query with the first private key;
transmit the signed second query to the service coordinator computing device via the V2X network;
receive, from the service coordinator computing device, an encrypted symmetric key; and
decrypt the symmetric key with the second private key.

21. The at least one non-transitory machine-readable storage medium of claim 17, the instructions, when executed, cause the at least one processor to receive an indication a signature of the signed query is invalid from the service coordinator computing device.

22. The at least one non-transitory machine-readable storage medium of claim 17, the instructions, when executed, cause the at least one processor to receive the first private key and the second private key from a service initiator computing device, a key-set comprising a plurality of private keys and a public key, the first private key a one of the plurality of private keys, a key-pair comprising the second private key and a key-pair public key.

23. The at least one non-transitory machine-readable storage medium of claim 17, the at least one characteristic comprising a direction, a minimum speed, or a maximum speed.

* * * * *